(12) United States Patent
Diehl et al.

(10) Patent No.: US 9,151,312 B2
(45) Date of Patent: Oct. 6, 2015

(54) COMBINATION OF FUNCTIONAL ELEMENT AND PRESSURE PLATE

(71) Applicant: PROFIL Verbindungstechnik GmbH & Co. KG, Friedrichsdorf (DE)

(72) Inventors: Oliver Diehl, Bad Homburg v.d.H. (DE); Richard Humpert, Bad Nauheim (DE); Andreas Lembach, Darmstadt (DE); Christian Sowa, Offenbach (DE)

(73) Assignee: PROFIL VERBINDUNGSTECHNIK GMBH & CO. KG, Friedrichsdorf (DE)

( * ) Notice: Subject to any disclaimer, the term of this patent is extended or adjusted under 35 U.S.C. 154(b) by 145 days.

(21) Appl. No.: 13/745,107

(22) Filed: Jan. 18, 2013

(65) Prior Publication Data
US 2013/0189054 A1    Jul. 25, 2013

(30) Foreign Application Priority Data
Jan. 20, 2012   (DE) .......................... 10 2012 001 087

(51) Int. Cl.
*F16B 37/06*   (2006.01)
*F16B 19/08*   (2006.01)

(52) U.S. Cl.
CPC .............. *F16B 19/08* (2013.01); *F16B 37/065* (2013.01)

(58) Field of Classification Search
USPC ......................... 411/173, 176, 183, 187, 188
See application file for complete search history.

(56) References Cited

U.S. PATENT DOCUMENTS

| | | | | |
|---|---|---|---|---|
| 375,350 A | * | 12/1887 | Glover | 411/378 |
| 3,467,417 A | * | 9/1969 | Whiteside et al. | 403/408.1 |
| 3,770,037 A | * | 11/1973 | Ernest | 411/184 |
| 3,823,526 A | * | 7/1974 | Rose | 403/408.1 |
| 4,010,519 A | * | 3/1977 | Worthing | 403/404 |
| 4,664,574 A | | 5/1987 | Kasai | |
| 5,037,259 A | * | 8/1991 | Duran et al. | 411/173 |
| 5,238,344 A | * | 8/1993 | Nagayama | 411/183 |
| 6,113,330 A | * | 9/2000 | Rupflin | 411/339 |

(Continued)

FOREIGN PATENT DOCUMENTS

| | | |
|---|---|---|
| DE | 31 07 131 A1 | 1/1982 |
| DE | 40 39 472 A1 | 6/1991 |

(Continued)

OTHER PUBLICATIONS

German Search Report dated Nov. 8, 2012 issued in German Patent Appln. No. 10 2012 001 087.7.

(Continued)

*Primary Examiner* — Flemming Saether
(74) *Attorney, Agent, or Firm* — Hershkovitz & Associates, PLLC; Abraham Hershkovitz; Eugene Rzucidlo

(57) ABSTRACT

The invention relates to a combination of a functional element having a flange section and a connection section, in particular a rivet element, and a pressure plate, in particular a pressure plate having an opening, for attachment to a component, in particular to a panel of composite material or sheet metal, wherein the functional element and the pressure plate are formed to be arranged on opposite sides of a hole of the component and are to be connected together via the connection section which extends through the hole, in particular by riveting, in order to clamp a region of the component surrounding the hole between the flange section and the pressure plate and wherein the pressure side of the pressure plate confronting the component in the attached state is provided with a means providing security against rotation.

8 Claims, 12 Drawing Sheets

(56) References Cited

U.S. PATENT DOCUMENTS 7,160,047 B2 * 1/2007 Mueller et al. ............... 403/283
2008/0079241 A1 4/2008 Fujimori et al.

FOREIGN PATENT DOCUMENTS

| DE | 10 2010 000 500 A1 | 8/2011 |
| DE | 10 2010 008 554 A1 | 8/2011 |
| DE | 102010000500 A1 | 8/2011 |
| EP | 0 080 697 A1 | 6/1983 |
| EP | 0 179 367 A2 | 4/1986 |
| GB | 678 532 A | 9/1952 |

OTHER PUBLICATIONS

English Translation of German Search Report.
English abstract of DE 31 07 131 A1.
English abstract of DE 40 39 472 A1.
English abstract of DE 102010000500A1.
European Search Report for European Patent Application No. EP 1315 1961 mailed on Apr. 18, 2013.
English Abstract for DE 10 2010 008 554 A1.
English Abstract for DE 10 2010 000 500 A1.

* cited by examiner

COMBINATION OF FUNCTIONAL ELEMENT AND PRESSURE PLATE

CROSS-REFERENCE TO RELATED APPLICATIONS

The present application claims priority under 35 U.S.C. §119 to German Patent Application No. 10 2012 001 087.7, filed on Jan. 20, 2012, the disclosure of which is expressly incorporated by reference herein in its entirety.

FIELD OF THE INVENTION

The invention relates to a combination of a functional element having a flange section and a connection section, in particular a rivet element, and a pressure plate, in particular a pressure plate having an opening, for attachment to a component, in particular to a panel of composite material or sheet metal.

SUMMARY OF THE INVENTION

The invention also relates to a component assembly composed at least of a combination of the herein described kind and a component, in particular a panel of composite material or sheet metal.

The invention further relates to a functional element, as well as to a pressure plate for a combination and/or a component assembly of the herein described kind.

Furthermore, the invention relates to a method for the attachment of functional elements to components, in particular to panels of composite material or sheet metal.

The component described herein can generally be manufactured from an arbitrary material in accordance with the invention. A preferred application is provided by the use of the combination in accordance with the invention composed of a functional element and a pressure plate comprising components made of composite materials.

Composite materials are frequently used in most diverse areas and consist mainly of plastic with embedded fiber reinforcement. The fiber reinforcement can for example take the form of tapes, fabrics, felts and mats. For example, coachwork parts of polyester resins reinforced with glass fibers and plastics, such as epoxy resins, reinforced with carbon fibers are frequently used in motor car construction. Numerous further components, such as consoles and cladding, are likewise also manufactured from such composite materials in practice. When using carbon fibers as a reinforcement fabrics of carbon fibers are frequently used because one can then obtain a reinforcement in all directions of the component.

The field of composite materials is however in no way restricted to glass fibers and carbon fibers. In practice many other reinforcement fibers can also be considered. Furthermore, the most diverse plastics can also be used as a matrix material.

Composite materials are composed of an arbitrary reinforcement material or fibers and an arbitrary, plastically deformable or meltable matrix material. The term "composite material" is used here in accordance with the invention and for this reason not only comprises plastics with fiber reinforcement, but, for example, also comprises matrix materials of metal, e.g. aluminum with a reinforcement material, such as e.g. carbon fiber or ceramic particles.

All such materials alternatively all of the above described materials are generically described as composite materials or fiber reinforced plastics. These materials can also be described by the generic term "organic sheet metals". This term is understood in some circles as a specialist term.

Preferably the present invention primarily uses those composite materials which use a thermoplastic material, i.e. a thermoplastic as matrix material. Such materials or composite materials are characterized in that they are soft or become pasty at elevated temperatures lying below the melting point.

It is however not precluded that duroplastics can also be used as a matrix material provided these are adequately soft or become soft or pasty at elevated temperature, and indeed at temperatures which lie beneath the temperatures at which the relevant matrix material is permanently damaged.

The invention can also be used in combination with composite materials which include matrix materials which are indeed not thermoplastics but which have not yet reached their final state, but are rather present in a state in which they are soft or pasty with or without heating but which can be transferred into a harder state in the course of time or because of external influences, for example, by the action of ultraviolet light or humidity or otherwise through a progressive polymerization or cross-linking.

It is frequently necessary to also use components of composite materials with fastener elements, for example in order to secure the corresponding components to other parts or to attach other parts to the fiber reinforced plastic components.

Both rivet elements and also bolt or nut elements can be considered as fastener elements or connector elements which can all be subsumated under the term "functional elements". The term "functional element" applies also for clips and bearings in the framework of the present invention which can likewise be secured to composite materials.

In order to ensure that a component made from a composite material is sufficiently soft or pasty, the component can be heated for the attachment of functional elements, at least in a region of a hole provided for the attachment, to a temperature dependent on the respective material at which the material of the composite material does not melt, but is softened or pasted to a desired degree.

If the material is, for example PA6, then the heating can take place to a temperature of for example 260° C.

The above explanations are not to be understood as statements exemplifying the background of the invention, but rather also form a part of the disclosure associated with the invention.

On the attachment of functional elements to components composed of composite material or a different material it is striven for to not focus the loading onto a small area of the region of the component surrounding the hole. Furthermore, it should be noted for fiber reinforced materials that the fibers should not be damaged or destroyed if possible. Moreover, one generally strives to attach the functional parts at the component as secure against rotation as possible.

The object underlying the invention is to provide a possibility for the attachment of functional elements to components, in particular to components manufactured of composite material or of relatively soft sheet metal which meets the above-named requirements as well as possible.

The solution of this object is achieved by a combination of a functional element having a flange section and a connection section and a pressure plate having the further features of claim 1. Such a combination of a functional element having a flange section and a connection section, in particular a rivet element, and a pressure plate, in particular a pressure plate having an opening, for attachment to a component, in particular to a panel of composite material or sheet metal, wherein the functional element and the pressure plate are formed to be arranged on opposite sides of a hole of the component and to be connected together via the connection section which extends through the hole, in particular by riveting, in order to clamp a region of the component surrounding the hole between the flange section and the pressure plate and wherein the pressure side of the pressure plate confronting the component in the attached state is provided with a means providing security against rotation.

Beneficial embodiments of the invention are detailed in the dependent claims.

Preferably the pressure side of a combination has a contour which differs from a circular shape. Such a contour of the pressure side can have a circular basic shape from which at least one missing section is removed and/or to which an added section is added. Advantageously the missing section is a circular sector or a circular segment, or in that the missing section is provided in the form of a cutout or of a bay. In a special embodiment of the combination a plurality of missing sections and/or added sections distributed in the peripheral direction are provided.

The pressure side can be bounded with a sharp edge at least regionally. Alternatively the pressure side can be flat or the pressure side can be provided with one or more raised portions. Such a raised portion can have an elongated, in particular rib-like or web-like shape and/or the raised portion can follow a part of the contour of the pressure side. Optionally the raised portion is made non-cutting at its free end.

In an embodiment of the combination the side of the pressure plate remote from the component in the attached state is provided with a collar surrounding the opening, with the collar in particular being designed in order to cooperate with a rivet section forming the connection section.

Advantageously the connection section is formed at least regionally at a rivet section. Alternatively the functional element could be a press in element and the connection section is then adapted to cooperate with the pressure plate such that the pressure plate is deformed on connection of the two elements to a combination.

In an advantageous embodiment of the combination the functional element and/or the pressure plate is provided with means providing security against rotation which, in the attached state, are active between the functional element and the pressure plate, with the means providing security against rotation in particular being formed at the connection section. This advantageously prevents a rotation of the component relative to either the functional element and/or the pressure plate.

Advantageously the means providing security against rotation are provided in a form of ribs extending in the axial direction and arranged distributed in the peripheral direction, with the ribs preferably extending at least approximately from a transition surface between the flange section and the connection section to a transition surface at the free end of the connection section.

In another embodiment of the combination a transition surface provided between the flange section and the connection section of the functional element has a curved extent, in particular a concavely curved extent.

Likewise the flange section preferably has a transition between an end section and a section with a reduced diameter relative to the end section, with the transition being formed by a transition surface which have an inclined or in particular concavely curved extent.

Alternatively the flange section could have a transition between an end section and a section with a reduced diameter in comparison with the end section, the transition being made of step-like shape, with the transition in particular having a radially extending transition surface.

In an embodiment of the combination an internal diameter of an opening of the pressure plate corresponds at least approximately to the outer diameter of the connection section of the functional element. Advantageously an outer diameter of the pressure plate is larger than the largest diameter of the flange section of the functional element.

The invention is based on the concept of not attaching the functional element alone to a component but rather to additionally use a pressure plate whereby functional elements and pressure plate being attached to the component coming from opposite sides of the component. The attached state is characterized in that, on the one hand, the connection section of the functional element and the pressure plate are connected to one another and indeed at the side of the component at which the pressure plate is located. The invention is furthermore characterized in that the pressure plate is provided with means providing security against rotation which cooperates with the component.

In total this leads to a special situation in which, on the one hand, a connection exists between the functional element and the pressure plate, with the security against rotation of the functional element not or at least not exclusively taking place through a collaboration of some kind between the functional element and the component, but rather indirectly via the pressure plate which is connected to the component in a manner providing security against rotation.

This state which can be manufactured in accordance with the invention has several advantages. Thus, an ideal load distribution can be achieved by means of a pressure plate or its pressure side confronting the component over the region of components surrounding the hole. Local load peaks in the region of the hole are avoided in this manner. The use of a pressure plate provided in addition to the functional element further enables a particularly secure firm and stable clamping of the region of the component surrounding the hole between the flange section of the functional element and the pressure plate and thus a secure retention of the functional element or of the combination of functional element and pressure plate at the component. A particular advantage is that the pressure plate contributes to the security against rotation or can serve at least largely alone from the security against rotation. For this purpose the pressure side of the pressure plate dimensioned to be comparatively large is exploited.

A connection between the connection section of the functional elements and of the pressure plate can in particular be a form-fitted connection which is effected essentially in the axial direction, for example a rivet connection. A rivet connection is, however, not essential. Thus it is, for example, conceivable that on attachment to the component the pressure plate is also or exclusively deformed and pressed into corresponding undercuts of the connection section.

Furthermore, the connection between the connection section of the functional element and the pressure plate can include a security against rotation of the connection section relative to the pressure plate. Thus the functional element and/or the pressure plate can be provided with means providing security against rotation which, in the attached state, are effective between the functional element and the pressure plate. In this design the situation results that the functional element is connected in a manner secure against rotation with the pressure plate, whereas the pressure plate is further connected in a manner secure against rotation with the component. The securing of the functional element to the component in a manner securing against rotation thus results directly via the pressure plate.

For the attachment of the functional element and of the pressure plate to the component one or more suitably formed dies are in particular used.

The security against rotation between the pressure plate and the component can take place partly or exclusively in that the pressure side of the pressure plate confronting the component is provided with means providing security against rotation in particular in the form of, for example, discretely distributed raised portions or projections which, on attachment to the components, can be pressed into the one side of the component. The raised portions can be elongated or point-like raised portions. Alternatively or in addition the recesses can also be provided at the pressure plate into which material of the component enters during the attachment.

In a particular design of the invention permission can be made as an alternative to or as an addition to such raised portion that the pressure side has a contour which deviates from a circular shape. This design enables a particular or particularly simple way of manufacturing a security against rotation between the pressure plate and the component which consists therein that the circumstance is exploited that, on the attachment of the pressure plate at the component, the pressure plate is at least slightly pressed into the component. Due to the pressure side having a contour which deviates from the circular shape a security against rotation automatically results through this.

In particular components of composite materials or relatively soft sheet metals have the alleged disadvantage that they are relatively "yielding" and can be pressed in with relatively small forces. On the one hand, one endeavors to avoid such a "coining" as far as possible. On the other hand, practice has shown that a small degree of such pressing in can be tolerated without problem. In connection with the design described here the pressing in or "coining" which is unavoidable in practice is exploited in order to produce a security against rotation to the pressure plate and the component. This is achieved in a design described here in that the pressure side of the pressure plate is provided with a contour which differs from a circular shape.

It can provided that the pressure plate is bounded at least regionally by a sharp edge, i.e. the contour of the pressure plate is formed at least regionally by a sharp edge.

In a preferred embodiment the side of the pressure plate remote from the component in the attached state is provided with a collar surrounding the opening. This collar serves in particular to cooperate with a rivet section formed by the connection section of the functional element. In this way the pressure plate is acted on by the rivet section of the functional element via the collar, whereby an advantageous introduction of the load is achieved into the section of the pressure plate contacting the component.

In a further aspect of the invention this relates to a functional element for the attachment to a component for a combination and/or for a component assembly including a pressure plate, wherein the functional element in particular has the features relating to the functional element of claim 1. Such a functional element has a flange section and a connection section and is formed to be arranged on a side of the component and whose connection section is adapted to pass through the component, either by passing through a pre-manufactured hole or by piercing the component and simultaneously passing through the component.

In a further aspect of the invention this also relates to a pressure plate for the attachment to a component for a combination and/or for a component assembly including a functional element, wherein the pressure plate in particular has the features of the pressure plate mentioned with regard to claim 1. Such a pressure plate is arranged at a side of a hole of the component, wherein a pressure side of the pressure plate confronting the component is provided with at least a means providing security against rotation.

The object is also satisfied by a component assembly. Such a component assembly comprising at least a combination of a functional element, a pressure plate and a component, in particular a panel of composite material or sheet metal, with the functional element having a flange section and a connection section, wherein the functional element and the pressure plate are arranged at opposite sides of a hole of the component and are connected to one another via a connection section which extends through the hole, wherein a region of the component surrounding the hole is trapped between the flange and the pressure plate, and wherein a form-fitted connection providing security against rotation exists between the pressure side of the pressure plate confronting the component and the component.

In an embodiment of the component assembly the pressure plate is pressed into the component for the realization of the connection providing security against rotation.

In a further embodiment of the component assembly a rivet connection exists between the functional element and the pressure plate, with the rivet connection in particular existing between a rivet section which includes the free end of the connection section and the side of the pressure plate remote from the component, preferably between the connection section and a collar which is arranged at a side of the pressure plate remote from the component and which surrounds an opening.

In another embodiment of the component assembly a form-fitted connection providing security against rotation exists between the functional element and the pressure plate.

In a yet further embodiment of the component assembly the flange section is pressed into the component, in particular in such a way that the flange section terminates with the component or is recessed in the component or in that the flange section projects beyond the component.

In a different embodiment of the component assembly the hole of the component has an axial extent with a constant internal diameter which is preferably smaller than the outer diameter of an end section of the step-like flange section or in that the hole of the component has a stepped axial extent, with an end section of the flange section being received in a section of the hole having the largest internal diameter.

Moreover, the object is satisfied by a method for the attachment of functional elements to components, in particular to panels of composite materials or sheet metal in which method the functional element and a pressure plate in particular provided with an opening are arranged on opposite sides of a hole of the component, in particular a previously manufactured hole, the functional element and the pressure plate are connected to one another via a connection section of the functional element extending through the hole, a region of the component surrounding the hole is trapped between a flange section of the functional element and the pressure plate and means providing security against rotation are provided at the pressure side of the pressure plate adjacent to the component are brought into form-fitted engagement with the component.

In a further embodiment of the method the pressure plate is pressed into the component for the realization of the connection providing security against rotation.

In a yet further embodiment of the method the functional element and the pressure plate are connected to one another by riveting, with the rivet connection in particular being produced between a rivet section including the free end of the connection section and the side of the pressure plate remote from the component, preferably between the connection section and a collar which surrounds an opening and which is arranged at the side of the pressure plate remote from the component.

In another embodiment of the method a form-fitted connection providing security against rotation is produced between the functional element and the pressure plate.

In an embodiment of the flange section is pressed into the component, in particular in such a way that the flange section terminates flush with the component or is recessed into the component, or in that the flange projects beyond the component.

Further embodiments of the invention are also set forth in the claims, in the description and in the drawing.

BRIEF DESCRIPTION OF THE FIGURES

The invention will be described by way of example in the following with reference to the drawings. There are shown.

DETAILED DESCRIPTION OF THE INVENTION

Figure 1A:
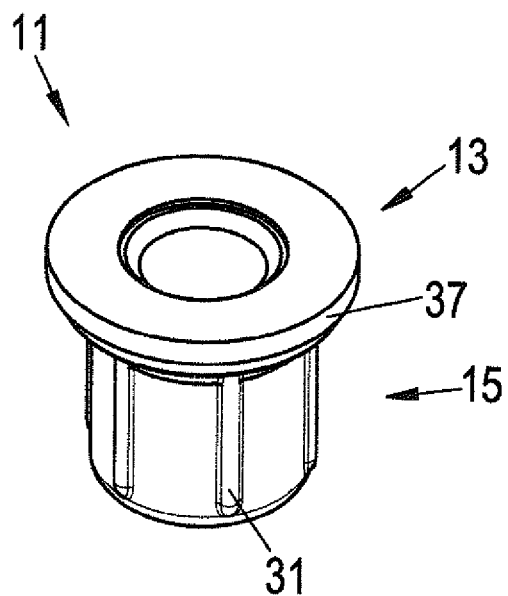
FIGS. 1a & 1b views of a functional element of a first embodiment of the invention.
Figure 1B:
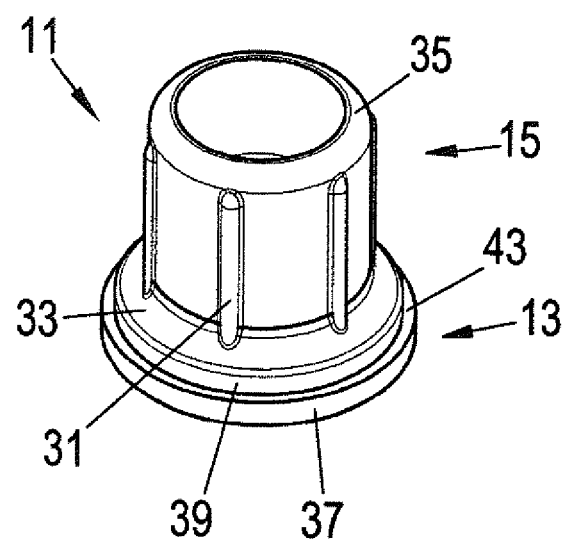
Figure 2A:
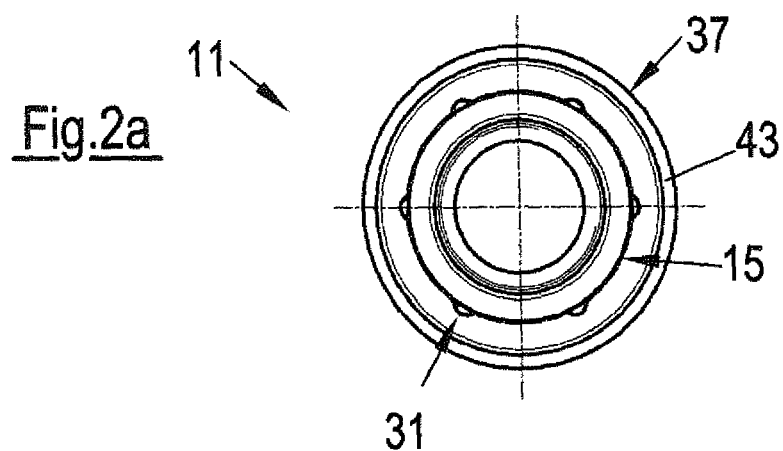
FIGS. 2a to 2c further views of the functional element of FIGS. 1a & 1b.
Figure 2B:
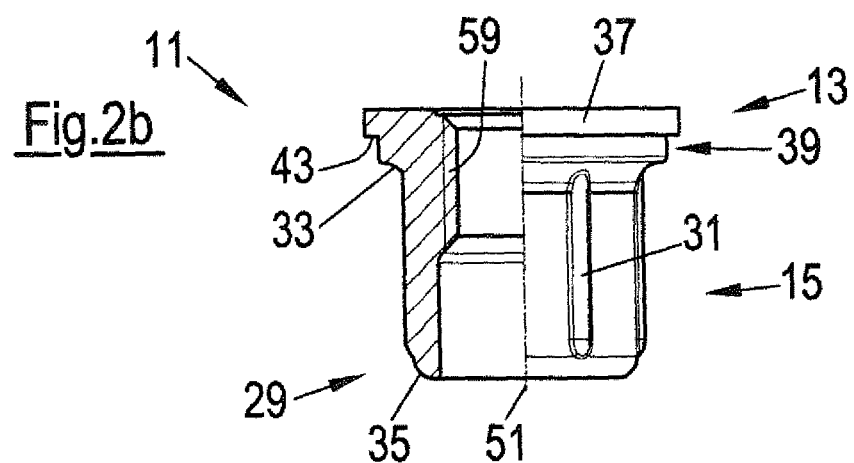
Figure 2C:
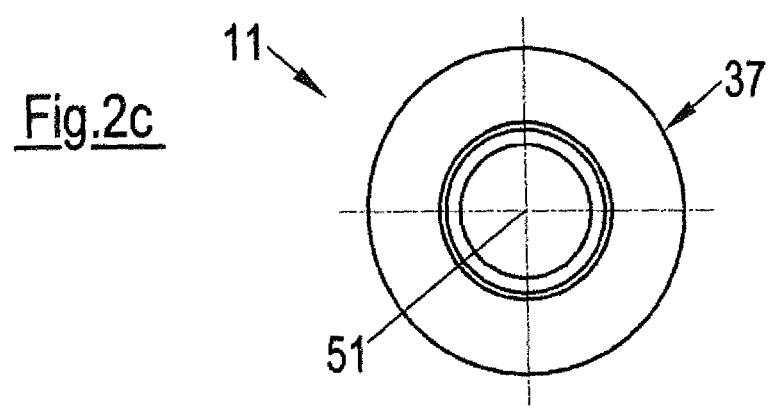

The FIGS. 1 and 2 show different views of the functional element 11 in accordance with the invention in accordance with the first embodiment.

The functional element 11 is formed as a rivet nut which has a passage defining a central axis 51 (see FIG. 2b) and with an internal thread 59 (see FIG. 2b) extending over a part of the axial length.

The functional element 11 includes a flange section 13 and a cylindrical connection section 15. The connection section 15 is formed at least partly in a thread-free region surrounding the free end of the connection section 15 as a rivet section 29 (see FIG. 2b). In this connection it should be noted that the internal thread 59 extends from an end of the functional element 11 including the flange section into the connection section 15 and up to the free end of the connection section 15 designed as the rivet section 29.

Figure 3A:
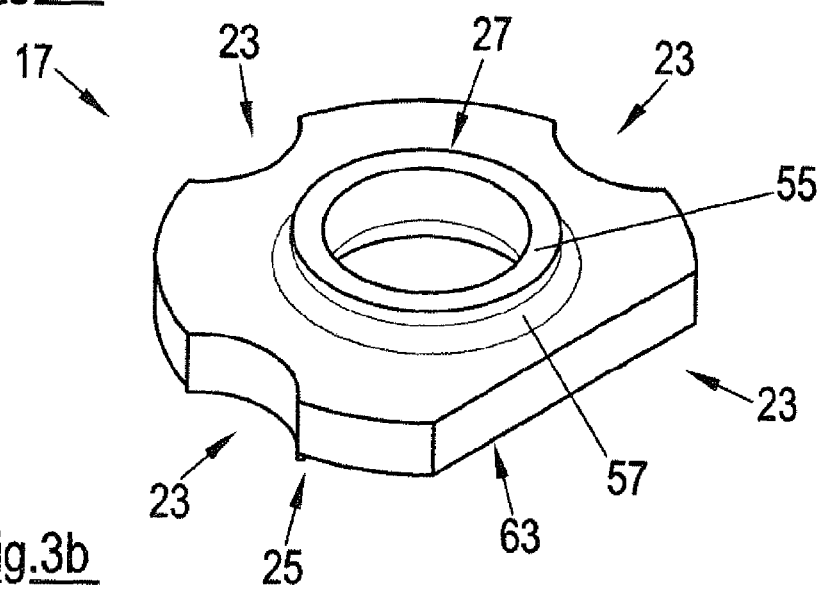
FIGS. 3a to 3c views of a pressure plate of the first embodiment of the invention.
Figure 3B:
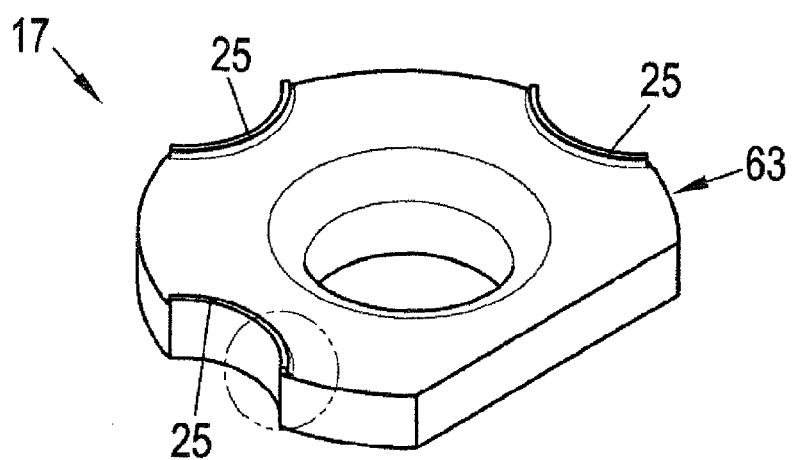
Figure 3C:
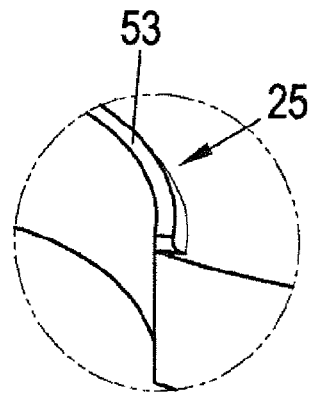
Figure 4A:
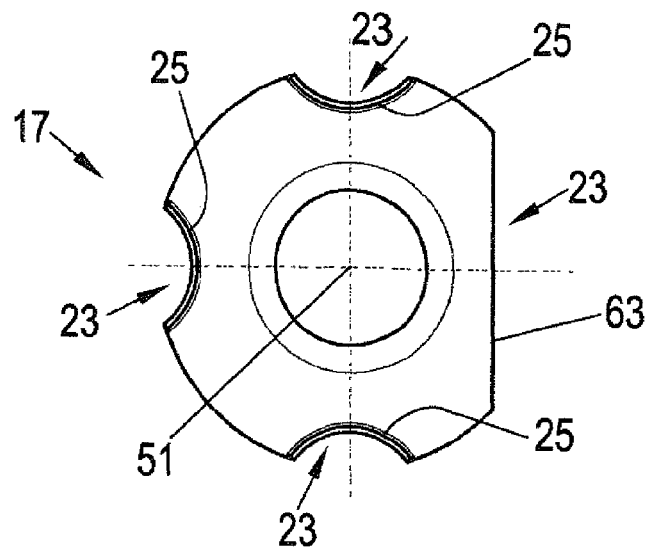
FIGS. 4a to 4c further views of the pressure plate of FIGS. 3a to 3c.
Figure 4B:
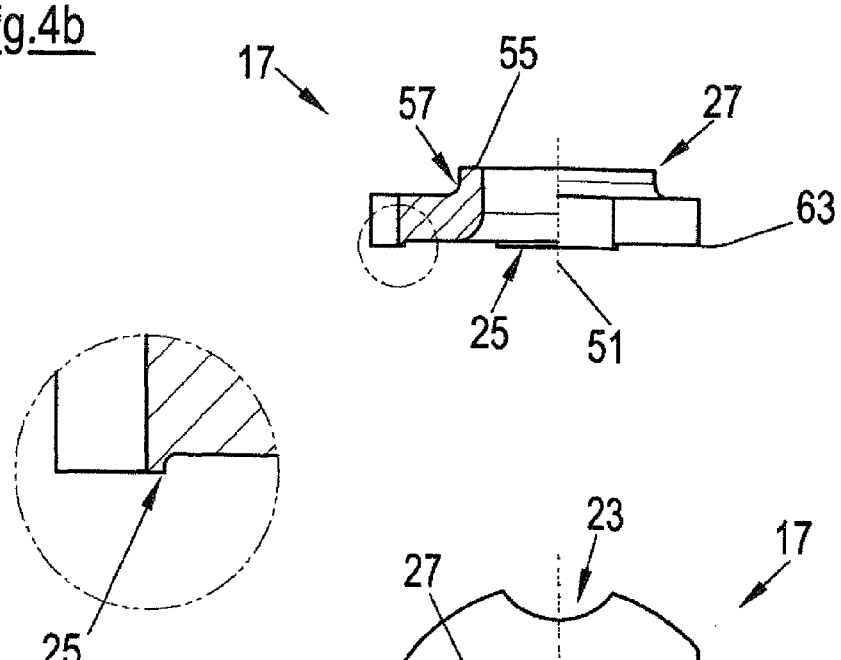
Figure 4C:
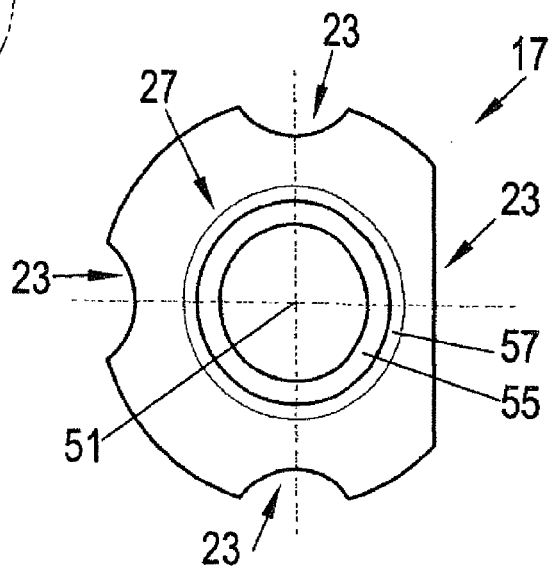

The connection section 15 is provided at its outer side with ribs 31 which extend in the axial direction and are arranged distributed in the circumferential direction and which serve as means providing security against rotation and can cooperate, in the installed state, with a pressure plate 17 (see FIGS. 3 to 5). The ribs 31 extend between a convexly curved transition surface 35 at the free end of the connection section 15 and a concavely curved transition surface 33 between the connection section 15 and the flange section 13.

The top view of the functional element of FIG. 2a shows six such ribs 31 it should, however, be noted that recesses (not shown) can likewise be provided rather than ribs. Moreover, the number of ribs (recesses) can be arbitrarily selected, e.g. 1 to 12 such ribs 31 can provided depending on the size of the functional element and/or the intended application of the functional element.

The flange section 13 includes a cylindrical end section 37 at which a section 39 adjoins with reduced diameter. The section 39 with reduced diameter merges via the curved transition surface 33 into the connection section 15 having a further reduced outer diameter. It should be noted in this connection that the cylindrical end section 37 includes a substantially planar end face in the variant shown in FIGS. 1a to 3c. The design of the end face can, however, also be selected in dependence on the type of application associated with the functional element.

In the illustrated embodiment a step is present between the end section 37 and the adjoining section 39 with reduced diameter, the step including a radially extending transition surface 43 (see e.g. FIG. 1b).

The FIGS. 3 and 4 show an embodiment of a pressure plate 17 in accordance with the invention. The pressure plate 17 has a disk section with the disk section having a circular basic shape differing from a circular shape and the cross-section of which is substantially constant over the axial height. It should be noted that the pressure plate 17 described herein can also be termed a washer.

The deviation from the circular shape results in the fact that missing sections 23 are taken away from the circular shape. A missing section 23 is provided in the form of a circular segment. Moreover, further missing sections 23 in the form of bays are provided which are distributed in the peripheral direction. At the side forming a pressure side of the pressure plate 17 in the attached state the disk section is provided with a sharp edge 63. In this connection the disk section can be designed with a surrounding sharp edge, with it alternatively also being possible to provide the sharp edge transition between the pressure side and the outer side of the disk section of the pressure plate 17 only regionally.

It is also possible to dispense fully with the sharp edged design since in the illustrated embodiment the pressure side is provided with elongated ribs or web-like raised portions 25 which follow the contour of a pressure plate in the region of the mentioned bays 23.

As the detail in accordance with FIG. 3c shows, the end faces 53 of the raised portions 23 are made flat, i.e. the elongated raised portions 25 are not cutting edges. In this way a situation is achieved in which, in the attached state, the component is simply pressed in the region of the raised portions 25. A cutting of fibers which are present in the material forming the material of the component is hereby avoided.

Both the contour of the pressure plate 17 deviating from the circular shape, which—as explained—can also be formed by an at least regionally provided sharp edge 63, and the explained raised portions 25 form means providing security against rotation of the pressure plate 17. As will also be explained in the following with reference to the embodiment of FIGS. 7 to 12 such raised portions 25 can be dispensed with, i.e. the pressure side of the pressure plate 17 adjacent to the component in the attached state can be made completely flat. Even with missing raised portions a sharp edged design of the pressure side is not essential, i.e. security against rotation can be realized exclusively by a contour of the edge of the pressure side or of the disk section of the pressure plate 17 which differs from the circular shape.

As FIG. 3a in particular shows the pressure plate 17 is provided with a collar 27 extending around its opening formed in the pressure plate 17 in the illustrated embodiment, the collar 27 is present at the side of the pressure plate 17 which is remote from the component in the attached state. A concavely curved transition surface 57 is present between the collar 27 and a substantially flat surface of the disk section. The end face 55 of the collar 27 is made flat.

The attachment of the combination in accordance with the invention of the functional element 11 and the pressure plate 17 to a component 19 is illustrated in FIGS. 5a to 5d. The die buttons or plungers used here are not shown.

A component 19 is in particular a panel-like element of a composite material, in particular a composite material of the initially explained kind, i.e. a so-called organo sheet. As an alternative, the component 19 can also be a relatively soft sheet metal.

The component 19 is pre-holed, with this pre-holing taking place, for example, by drilling or punching. In the illustrated embodiment the hole 21 has an internal diameter which is constant over the entire axial length. The central axis 51 of the hole 21 of the component 19, of the passage in the functional element 11 and of the opening formed in the pressure plate 17 coincide in the attached state in accordance with FIG. 5d.

During the attachment process the pressure plate 17 is brought into engagement with its pressure side on the one side of component 19 at the region of the component 19 surrounding the hole 21. The connection section 15 of the functional element 11 is introduced, coming from the other side of the component 19 through the hole 21 of the component 19 through the opening formed in the pressure plate 17. Thereafter the rivet section 29 of the connection section 15 is bent outwardly by means of a non-illustrated die button. In this way a rivet connection exists between the functional element 11 and the pressure plate 17 and thus between the functional element 11 and the component 15.

Following the assembly of the individual components, the reshaped rivet section 29 of the functional element 11 acts on the planar end side 55 of the collar 27 of the pressure plate 17.

Figure 5A:
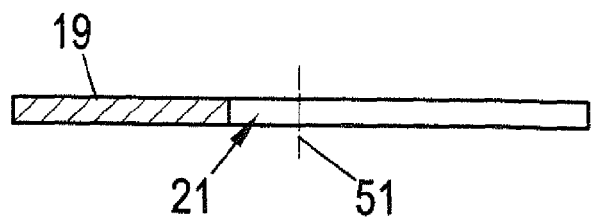
FIGS. 5a to 5d illustrations detailing the assembly of a first component assembly in accordance with the invention.
Figure 5B:
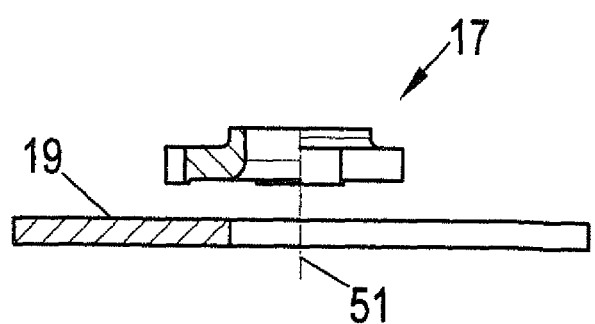
Figure 5C:
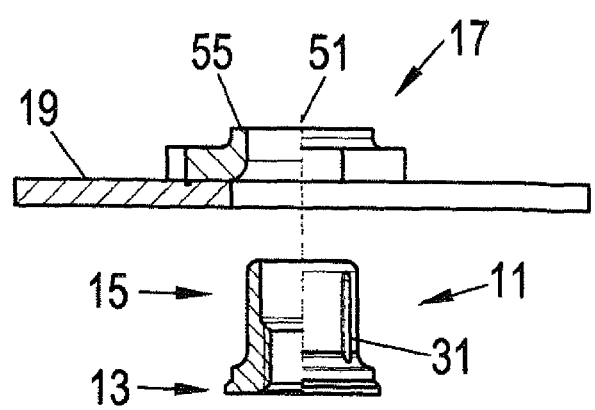
Figure 5D:
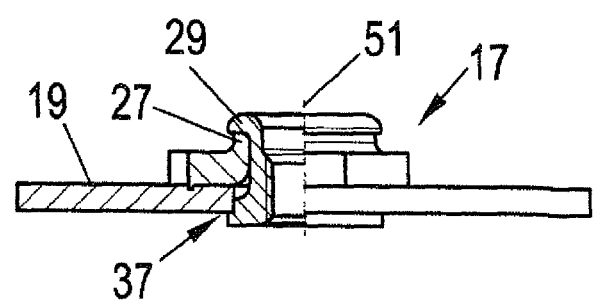

The region of the component 19 surrounding the hole 21 is trapped, i.e. clamped, in the attached state in accordance with FIG. 5d, between the flange section 13 of the functional element 11 and the pressure plate 17 acted on by the rivet section 29.

During the attachment the raised portions 25 at the pressure side of the pressure plate 17 press into the component 19 and thereby ensure a security against rotation of the pressure plate 17 at the component 19. The contour of the pressure plate which differs from the circular shape and the pressure side of the pressure plate 17 adjacent the component 19 contribute to this security against rotation, since not only the raised portions 25 but rather also the disk section of the pressure plate 17 is pressed into the component.

The axially extending ribs 31 of the connection section 15 of the functional element 11 serve for a form-fitted connection between the connection section 15 and an inner wall bounding the opening of the pressure plate 17. In this way the functional element 11 and thus in total the combination of the functional element 11 and the pressure plate 17 are held secure against rotation at the component 19 via the pressure plate 17.

In the illustrated embodiment, the internal diameter of the hole 21 of the component 19 corresponds to the outer diameter of the section 39 with reduced diameter which adjoins the end section 37 of the flange section 13 and the section 39 thus enters into the hole 21. The end section 37 of the flange section 13 in contrast has an external diameter which is larger than the internal diameter of the hole 21. As a consequence, in the attached state in accordance with FIG. 5d, the radial transition surface 43 (see FIG. 2b) of the flange section 13 contacts the side of the component 19 remote from the pressure plate 17. Thus, in this embodiment, the end section 37 of the functional element 11 projects beyond one side of the component 19.

Figure 6A:
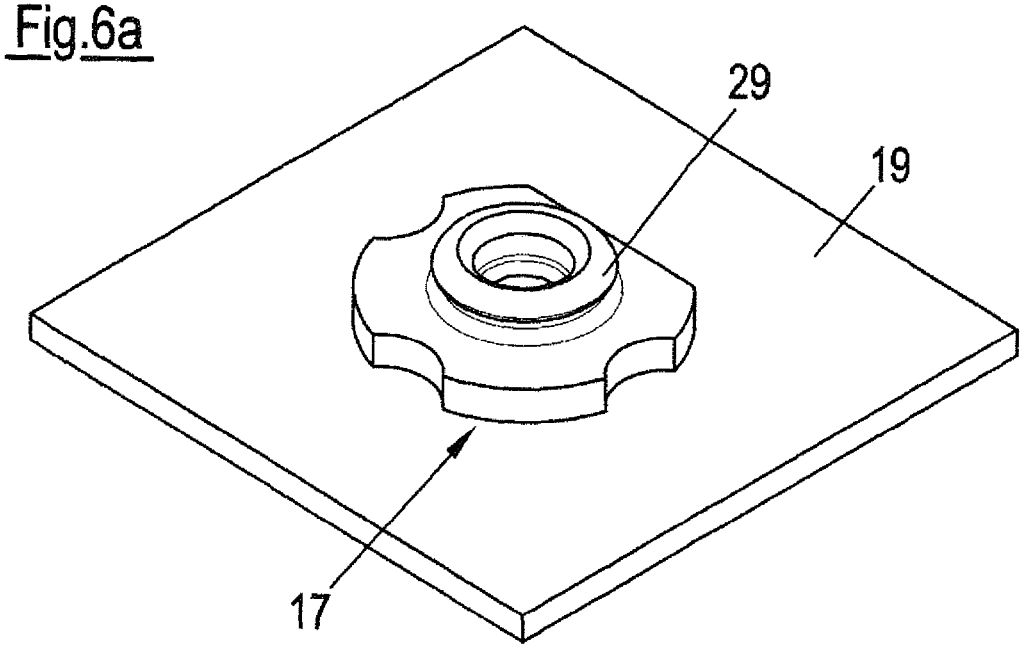
FIGS. 6a & 6b views of the assembled component assembly of FIGS. 5a and 5d.
Figure 6B:
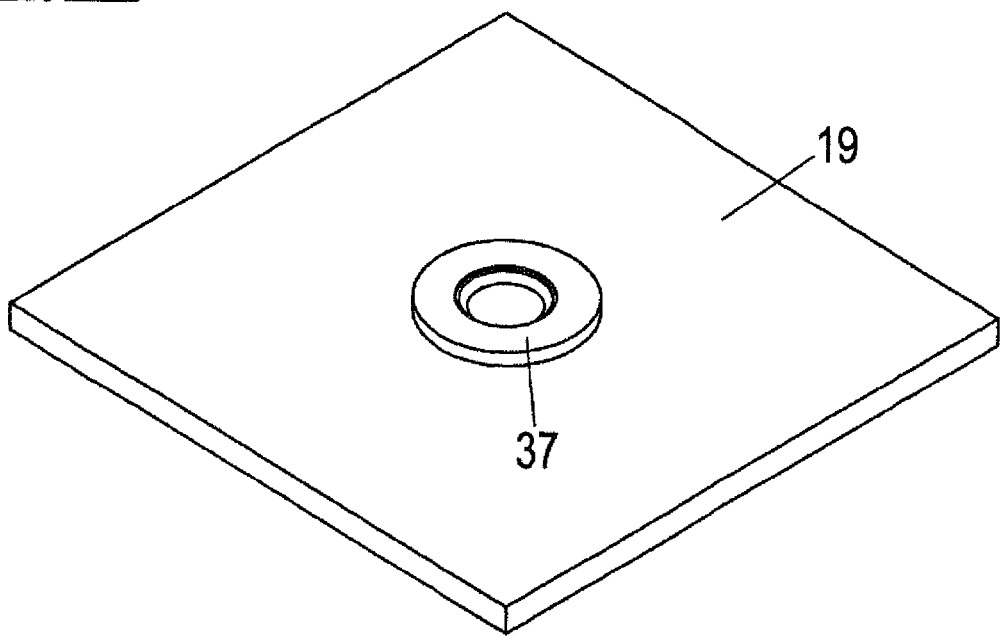
Figure 7A:
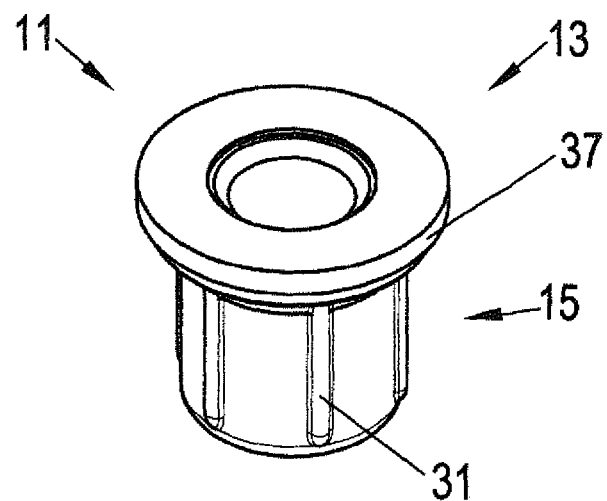
FIGS. 7a & 7b views of a functional element of a second embodiment of the invention.
Figure 7B:
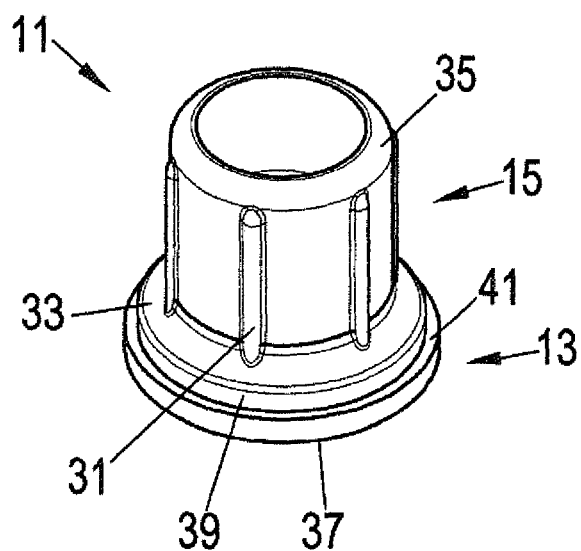
Figure 8A:
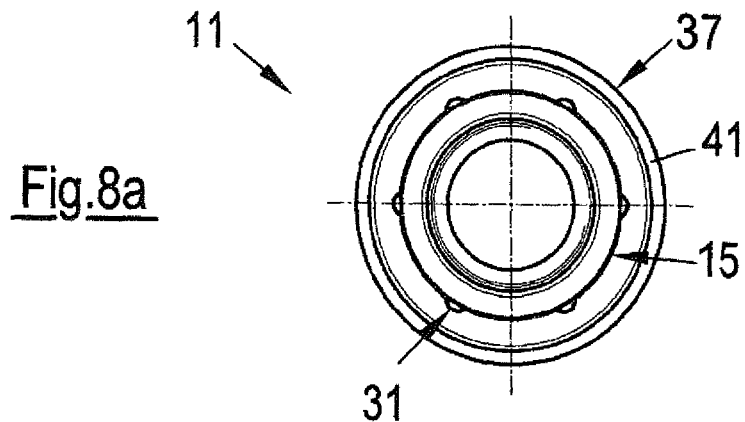
FIGS. 8a to 8c further views of the functional element of FIGS. 7a & 7b.
Figure 8B:
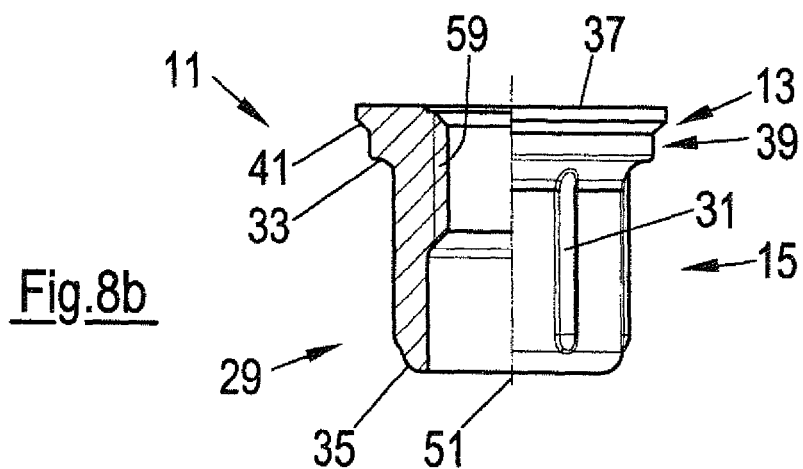
Figure 8C:
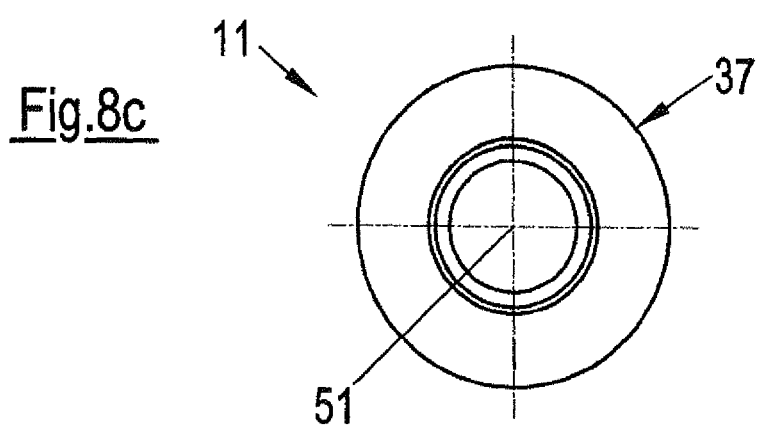

The FIGS. 6a and 6b show perspective views of the two sides of the component 19 with the attached combination of the functional element 11 and the pressure plate 17, i.e. of the component assembly formed in the above-described way. In FIG. 6a the rivet section 29 of the functional element 11, in particular the reshaped section which acts on the collar 27 of the pressure plate 17 is in particular shown in the form of a formed rivet bead, whereas in FIG. 6b the projecting end section 37 of the flange section 13 is shown.

The embodiment of FIGS. 7 to 12 of the invention are distinguished from the embodiment in accordance with the invention of FIGS. 1 to 6 in the manner which will be explained in the following. In the following further comments will not be made on features common between the two embodiments. The same reference numerals designate common parts, sections or regions of the individual components.

In the functional element 11 in accordance with the second embodiment an inclined or conically extending transition surface 41 is provided between the end section 37 and the section 39 with reduced diameter.

In the pressure plate 17 the contour differing from the circular shape is provided by a single missing section 23 in the form of a missing circular segment. Moreover the contour of the pressure side of the pressure plate 17 is formed as a surrounding sharp edge 63. Together with the deviation from the circular shape and the sharp edged design the contour of the pressure side of the pressure plate 17 forms the security against rotation of the pressure plate 17.

Furthermore, the disk section of the pressure plate 17 is provided at its side remote from the component 19 in the attached state with an inclined feature 61 forming a margin which is interrupted in the region of the missing section 23.

Figure 9A:
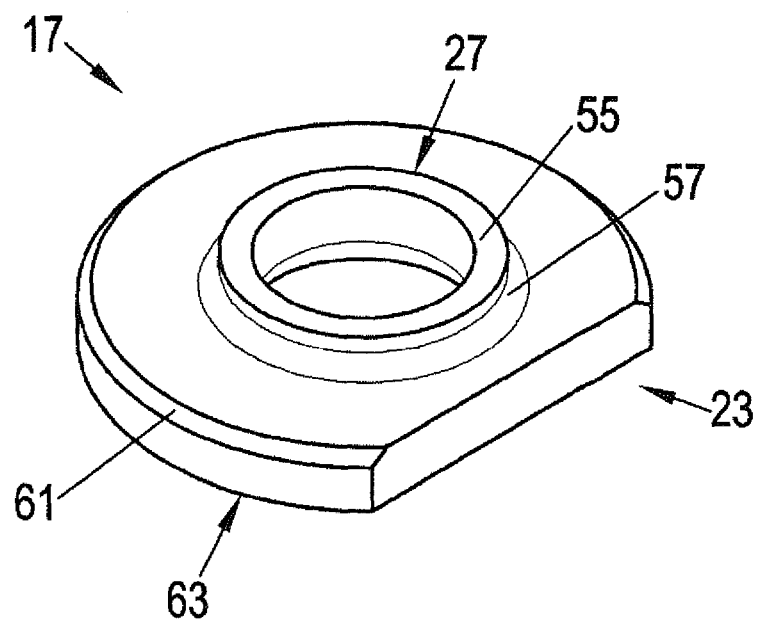
FIGS. 9a & 9b views of a pressure plate of the second embodiment of the invention.
Figure 9B:
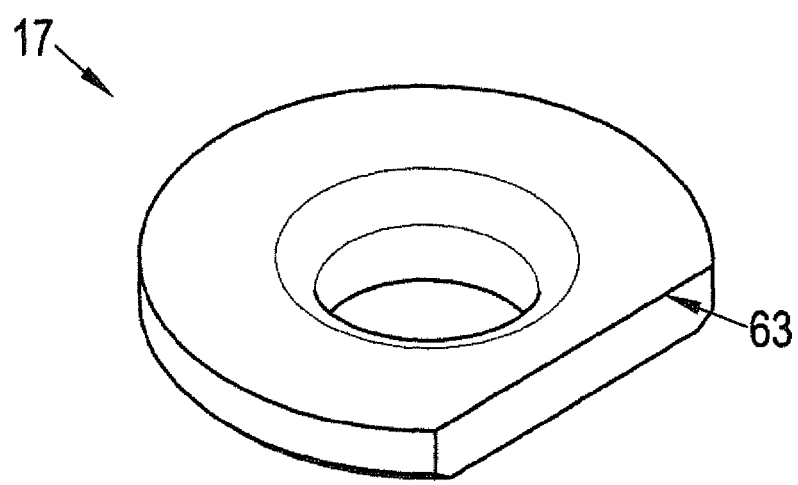
Figure 10A:
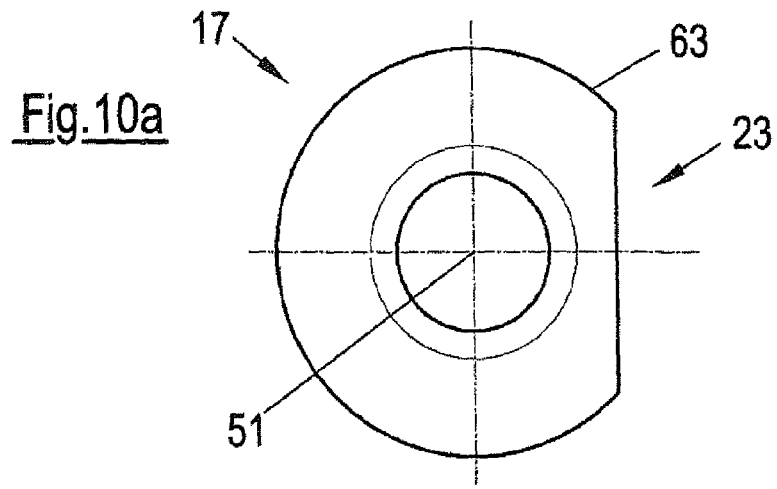
FIGS. 10a to 10c further views of the pressure plate of FIGS. 9a & 9b.
Figure 10B:
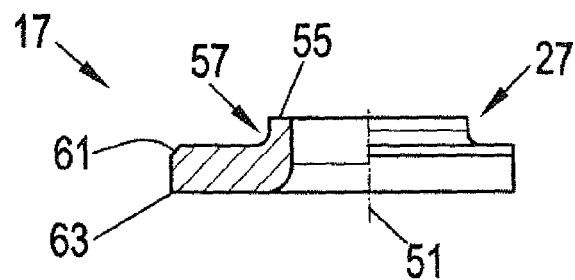
Figure 10C:
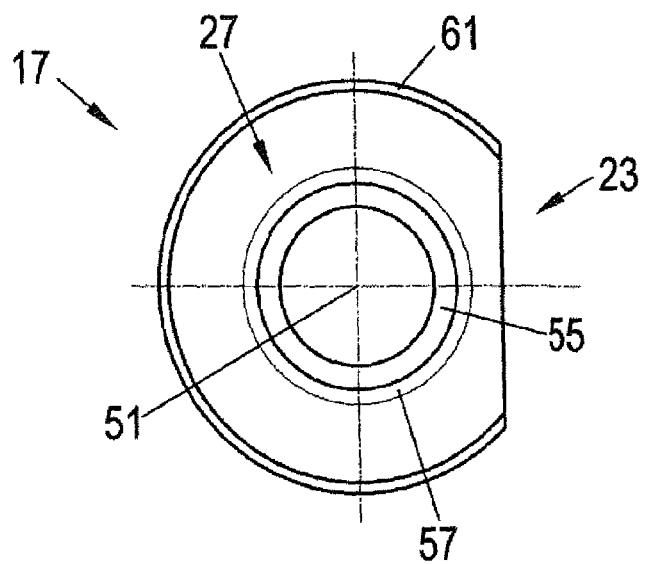

As can be seen in particular from FIG. 9b the pressure side of the pressure plate 17 is made flat.

In accordance with FIG. 11 the hole 21 of the component 19 is provided with a stepped axial extent. A section 45 of the hole which is adjacent the flange section 13 of the functional element 11 in an attached state has the largest internal diameter of the hole 21 which corresponds to the outer diameter of the end section 37 of the flange section 13. The outer diameter of the section 37 which adjoins the end section 37 corresponds to the internal diameter of the section of the hole 21 adjacent to the pressure plate 17 in the attached state. Moreover, the inclined transition surface 41 between the two sections 37 and 39 of the flange section 13 corresponds to a transition between the two sections of the hole 21.

Figure 11A:
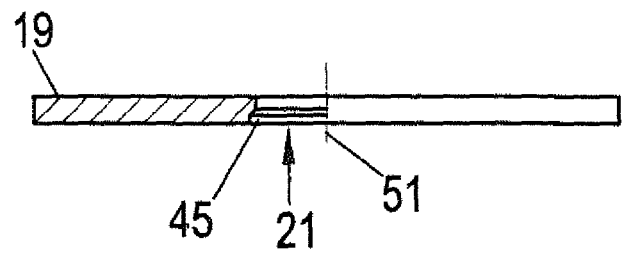
FIGS. 11a to 11d illustrations detailing the assembly of a second component assembly in accordance with the invention.
Figure 11B:
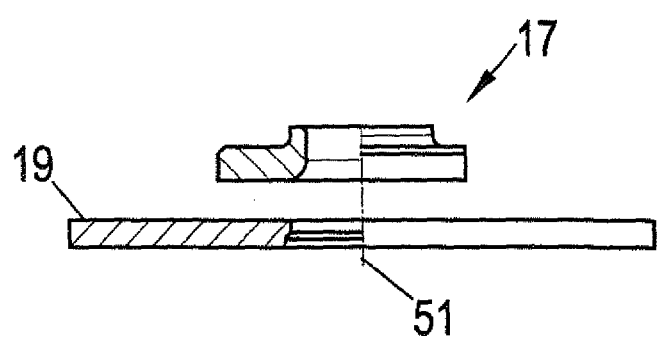
Figure 11C:
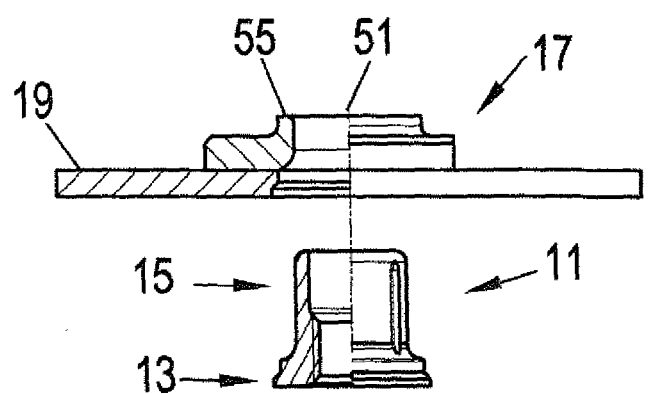
Figure 11D:
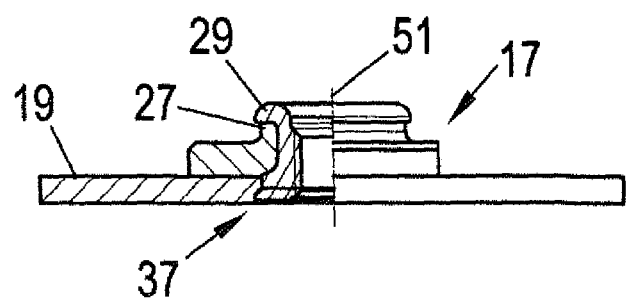

As a consequence the flange section 13 of the functional element 11 can be received in a hole 21 of the component 19. As FIG. 11d shows, the flange section 13 of the functional element 11 is recessed into the component 19 in the attached state. Alternatively, the design can take place in such a way that the flange section 13 finishes flush with the component 19.

In this connection it should be noted that the component 19 shown in FIGS. 11a to 11d having the stepped axial extent can also be used in combination with the functional element 11 shown in FIGS. 1 to 6. Likewise any of the components illustrated in detail in FIGS. 1 to 12 can be combined with one another to form advantageous combinations and/or component assemblies in accordance with the invention.

Figure 12A:
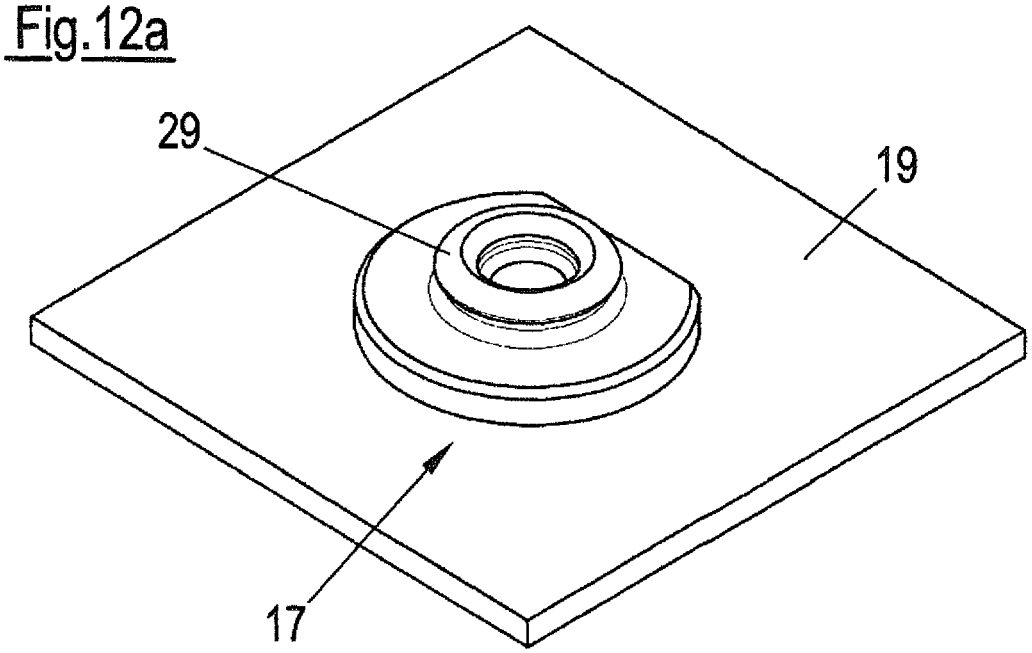
FIGS. 12a & 12b views of the assembled component assembly of FIGS. 11a to 11d.
Figure 12B:
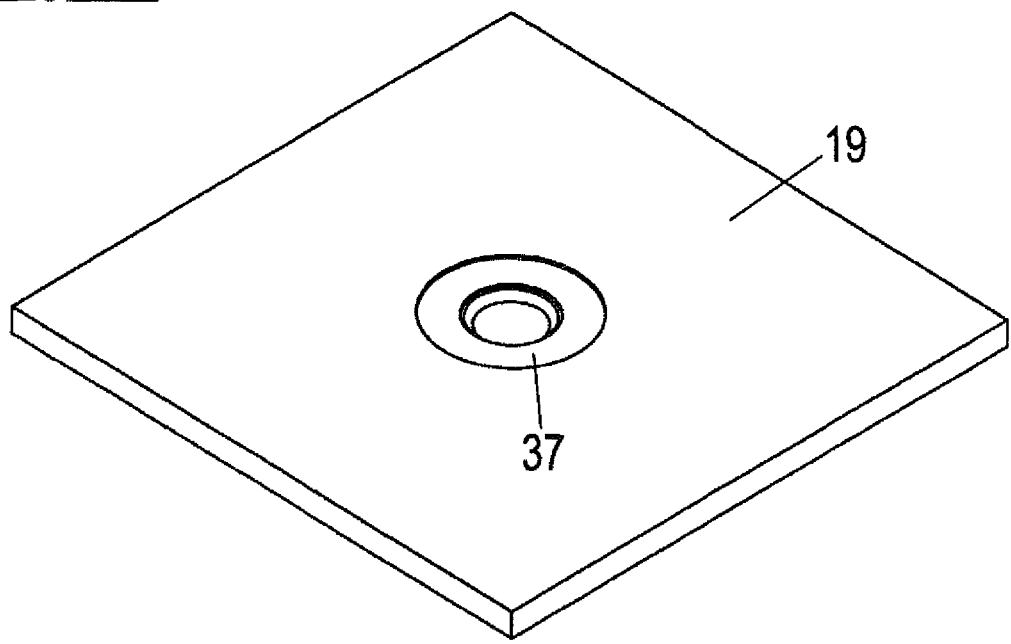

The FIGS. 12a and 12b in turn show perspective views on the two sides of the so formed component assembly of the component 19, the functional element 11 and the pressure plate 17.

The invention can also be thought of as directed to a component assembly comprising at least a combination of a functional element (11) having a flange section (13) as well as a connection section (15), a pressure plate (17) and a component (19), wherein the functional element (11) and the pressure plate (17) are arranged at opposite sides of a hole (21) of the component (19) and are connected to one another via a connection section (15) which extends through the hole (21), wherein a region of the component (19) surrounding the hole (21) is trapped between the flange (13) and the pressure plate (17), and wherein a form-fitted connection providing security against rotation exists between the pressure side of the pressure plate (17) confronting the component (19) and the component (19).

In the component assembly the pressure plate (17) is pressed into the component (19) for the realization of the connection providing security against rotation.

Moreover, a rivet connection exists between the functional element (11) and the pressure plate (17).

In addition the rivet connection can exist either between a rivet section (29) which includes the free end of the connection section (15) and the side of the pressure plate (17) remote from the component (19), or between the connection section (15) and a collar (27) which is arranged at a side of the pressure plate (17) remote from the component (19) and which surrounds an opening.

Also, a form-fitted connection providing security against rotation exists between the functional element (11) and the pressure plate (17).

The flange section (13) is usually pressed into the component (19) and may be pressed into the component (19) in such a way that the it terminates flush with the component (19) or is recessed in the component (19) or such that the flange section (13) projects beyond the component (19).

The hole (21) of the component (19) usually has an axial extent with a constant internal diameter and the internal diameter is normally smaller than the outer diameter of an end section (37) of the step-like flange section (13).

The hole of the component (19) may alternatively have a stepped axial extent, with an end section (37) of the flange section (13) being received in a section (45) of the hole (21) having the largest internal diameter.

The invention is also directed to a functional element adapted for use in a combination in accordance with claim 1 for clamping a region of the component (19) surrounding the hole (21), through which the connection section extends, between the flange section (13) and the pressure plate (17).

The invention is also directed to functional element adapted for use in a component assembly as described above.

Moreover, the invention is directed to a pressure plate adapted for use in a combination in accordance with claim 1.

The invention is also directed to a pressure plate adapted for use in a component assembly as described above.

The invention can also be considered as directed to a method for the attachment of functional elements (11) to components (19), in which
the functional element (11) and a pressure plate (17) are arranged on opposite sides of a hole (21) of the component (19)
the functional element (11) and the pressure plate (17) are connected to one another via a connection section (15) of the functional element (11) extending through the hole (21),
a region of the component (19) surrounding the hole (21) is trapped between a flange section (13) of the functional element (11) and the pressure plate (17) and
means providing security against rotation are provided at the pressure side of the pressure plate (17) adjacent to the component (19) are brought into form-fitted engagement with the component (19).

In such a method the pressure plate (17) may be pressed into the component (19) for the realization of the connection providing security against rotation.

Also the functional element (11) and the pressure plate (17) may be connected to one another by riveting.

The rivet connection may be produced between a rivet section (29) including the free end of the connection section (15) and the side of the pressure plate (17) remote from the component.

Moreover, the rivet connection may be produced between the connection section (15) and a collar (27) which surrounds an opening and which is arranged at the side of the pressure plate (17) remote from the component (19).

A form-fitted connection providing security against rotation is produced between the functional element (11) and the pressure plate (17).

In the method the flange section (13) is pressed into the component (19).

This may be done in such a way that the flange section (13) terminates flush with the component (19) or is recessed into the component (19), or such that the flange (13) projects beyond the component (19).

Although the embodiments shown relate to functional elements having a rivet section which are thus rivet elements, it is also possible to realize the invention using press-in elements in which the element itself is not de-formed, or is not intentionally deformed, but rather material of the pressure disc is caused to flow into undercuts of the functional element to produce a form-fitted connection secure against rotation.

REFERENCE NUMERAL LIST 11 functional element
13 flange section
15 connection section
17 pressure plate
19 component
21 hole
23 missing section
25 raised portion
27 collar
29 rivet section
31 means providing security against rotation, rib
33 transition surface
35 transition surface
37 end section of the flange section
39 section with reduced diameter
41 inclined transition surface
43 radial transition surface
45 section with largest internal diameter
51 central axis
53 end side of the raised portion
55 end side of the collar
57 transition surface
59 internal thread
61 chamfer
63 sharp edge

The invention claimed is:

1. A combination of a functional element (11) having a flange section (13) and a connection section (15) and a pressure plate (17) for attachment to a component (19) having a hole (21) therein and a region surrounding the hole, the pressure plate having an opening
wherein the functional element (11) and the pressure plate (17) are formed to be arranged on respective first and second oppositely disposed sides of the hole (21) of the component (19) and to be connected together in an attached state via the connection section (15) which extends through the hole (21) in order to clamp the region of the component (19) surrounding the hole (21) between the flange section (13) and the pressure plate (17) and wherein the plate has a contour which differs from a circular shape and wherein the contour of a top side of the plate substantially corresponds to the contour of a bottom side of the plate and that these contours differ from a circular shape and a substantially flat pressure side confronting the adjacent second side of the component, wherein the contour of the pressure side of the pressure plate (17) confronting the component (19) is adapted to be at least slightly pressed into the component to provide a security against rotation in the attached state.

2. The combination in accordance with claim 1, wherein the component is a panel of material consisting of at least one of a composite material and a sheet metal material.

3. The combination in accordance with claim 1, wherein a contour of the pressure side has a circular basic shape from which at least one section (23) is removed.

4. The combination in accordance with claim 3, wherein the missing section (23) is selected from the group comprising a sector, a segment, a cutout and a bay.

5. The combination in accordance with claim 1, wherein the pressure side is bounded with a sharp edge at least regionally.

6. The combination in accordance with claim 1, wherein a side of the pressure plate (17) remote from the component (19) in the attached state is provided with a collar (27) surrounding the opening.

7. The combination in accordance with claim 6, wherein the collar (27) is adapted to cooperate in the attached state with a rivet section (29) forming the connection section (15).

8. The combination in accordance with claim 1, wherein the outer diameter of the pressure plate (17) is larger than a largest diameter of the flange section (13) of the functional element (11).

* * * * *